(12) United States Patent
Miller et al.

(10) Patent No.: US 10,529,235 B2
(45) Date of Patent: *Jan. 7, 2020

(54) SYSTEM AND METHOD FOR VIRTUAL TRANSFORMATION OF STANDARD OR NON-CONNECTED VEHICLES

(71) Applicant: Ford Global Technologies, LLC, Dearborn, MI (US)

(72) Inventors: Kenneth James Miller, Canton, MI (US); Charles James Miller, Canton, MI (US); Cynthia M. Neubecker, Westland, MI (US); Brad Alan Ignaczak, Canton, MI (US); Adil Nizam Siddiqui, Farmington Hills, MI (US); Jonathan Diedrich, Carleton, MI (US); Somak Datta Gupta, Canton, MI (US); Haron Abdel-Raziq, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,168

(22) Filed: Jun. 29, 2018

(65) Prior Publication Data

US 2018/0308361 A1    Oct. 25, 2018

Related U.S. Application Data

(60) Division of application No. 15/076,210, filed on Mar. 21, 2016, now Pat. No. 10,013,881, which is a
(Continued)

(51) Int. Cl.
*G08G 1/00* (2006.01)
*G08G 1/16* (2006.01)
(Continued)

(52) U.S. Cl.
CPC .......... *G08G 1/162* (2013.01); *G05D 1/0022* (2013.01); *G05D 1/0066* (2013.01); *G08G 1/166* (2013.01); *G08G 1/20* (2013.01); *H04L 67/12* (2013.01)

(58) Field of Classification Search
CPC ............................ G08G 1/162; G05D 1/0022
See application file for complete search history.

(56) References Cited

U.S. PATENT DOCUMENTS 6,351,211 B1    2/2002 Bussard
7,209,050 B2    4/2007 Corcoran, III
(Continued)

FOREIGN PATENT DOCUMENTS

CN    103544850 A    1/2014
DE    102004062497 A1    7/2006
(Continued)

OTHER PUBLICATIONS

Fei Ye, Matthre Adams, and Sumit Roy, V2V Wireless Communication Protocol for Resr-End Collision Avoidance on Highways, University of Washingtion, Seattle, 2008, http://www.ee.washington.edu/research/funlab/Publications/2008/2008 fei v2v.pdf.
(Continued)

*Primary Examiner* — Jess Whittington
(74) *Attorney, Agent, or Firm* — Frank Lollo; Eversheds Sutherland (US) LLP

(57) ABSTRACT

In various embodiments, the present disclosure includes a system for reducing vehicular collisions having: (a) a vehicle comprising sensors, an acceleration system, a braking system, a processor, and memory; and (b) programs operatively coupled to the vehicle including: (1) a marking program configured to mark an outside vehicle as V2X or
(Continued)

standard; (2) a reaction program configured to generate a signal in response to the mark, the signal being based on the mark.

14 Claims, 11 Drawing Sheets

Related U.S. Application Data continuation-in-part of application No. 14/991,496, filed on Jan. 8, 2016, now Pat. No. 9,959,763.

(51) Int. Cl.
*G05D 1/00* (2006.01)
*H04L 29/08* (2006.01)

(56) References Cited

U.S. PATENT DOCUMENTS

| | | | |
|---|---|---|---|
| 7,295,925 B2 | 11/2007 | Breed | |
| 7,304,589 B2 | 12/2007 | Kagawa | |
| 7,495,550 B2 | 2/2009 | Huang et al. | |
| 7,994,902 B2 | 8/2011 | Avery et al. | |
| 8,229,663 B2 | 7/2012 | Zeng | |
| 8,310,353 B2 | 11/2012 | Hinninger | |
| 8,351,712 B2 | 1/2013 | Lee | |
| 8,520,695 B1 | 8/2013 | Rubin et al. | |
| 8,886,386 B2 | 11/2014 | Merk et al. | |
| 9,129,532 B2 | 9/2015 | Rubin | |
| 9,159,231 B2 | 10/2015 | Noh | |
| 9,487,212 B1 | 11/2016 | Adam | |
| 9,858,817 B1 | 1/2018 | Bletzer | |
| 2003/0112133 A1* | 6/2003 | Webb | G07C 5/008 340/436 |
| 2005/0012604 A1 | 1/2005 | Takahashi | |
| 2005/0275514 A1 | 12/2005 | Roberts | |
| 2006/0161315 A1 | 7/2006 | Lewis et al. | |
| 2007/0083318 A1* | 4/2007 | Parikh | B60W 10/06 701/96 |
| 2008/0055066 A1* | 3/2008 | Griffin | B60Q 1/46 340/474 |
| 2008/0180238 A1* | 7/2008 | Plummer | B60Q 1/2615 340/468 |
| 2009/0037088 A1 | 2/2009 | Taguchi | |
| 2009/0058677 A1 | 3/2009 | Tseng | |
| 2009/0167514 A1 | 7/2009 | Lickfelt | |
| 2009/0201173 A1 | 8/2009 | Okabe | |
| 2009/0248284 A1* | 10/2009 | Yoshioka | G01C 21/26 701/117 |
| 2009/0292459 A1 | 11/2009 | Zuccotti et al. | |
| 2010/0049393 A1 | 2/2010 | Emam | |
| 2010/0114467 A1 | 5/2010 | Samuel et al. | |
| 2010/0214085 A1 | 8/2010 | Avery | |
| 2012/0099541 A1* | 4/2012 | Park | H04W 72/10 370/329 |
| 2013/0147615 A1* | 6/2013 | Chen | B60Q 1/323 340/425.5 |
| 2013/0223686 A1 | 8/2013 | Shimizu | |
| 2013/0238181 A1 | 9/2013 | James | |
| 2013/0279392 A1* | 10/2013 | Rubin | H04W 72/005 370/312 |
| 2013/0279491 A1 | 10/2013 | Rubin | |
| 2014/0244068 A1 | 8/2014 | Dariush | |
| 2014/0267726 A1 | 9/2014 | Lin | |
| 2014/0365104 A1 | 12/2014 | Sasaki | |
| 2015/0046058 A1 | 2/2015 | Nagata | |
| 2015/0081202 A1 | 3/2015 | Levin | |
| 2015/0149019 A1* | 5/2015 | Pilutti | G08G 1/22 701/23 |
| 2015/0287323 A1* | 10/2015 | Wells | G08G 1/04 701/29.3 |
| 2015/0353078 A1 | 12/2015 | Kaminade | |
| 2015/0381751 A1* | 12/2015 | Haran | H04L 67/28 709/217 |
| 2016/0036917 A1 | 2/2016 | Koravadi et al. | |
| 2016/0133130 A1 | 5/2016 | Grimm et al. | |
| 2016/0231746 A1* | 8/2016 | Hazelton | G05D 1/0257 |
| 2016/0242223 A1* | 8/2016 | Brahmi | H04W 28/021 |
| 2016/0264045 A1* | 9/2016 | Ng-Thow-Hing | B60Q 9/00 |
| 2017/0032402 A1 | 2/2017 | Patsiokas | |
| 2017/0053530 A1 | 2/2017 | Gogic | |
| 2017/0066374 A1 | 3/2017 | Hoye | |
| 2017/0101092 A1 | 4/2017 | Nguyen Van | |
| 2017/0142555 A1* | 5/2017 | Ljung | H04W 4/027 |
| 2017/0162042 A1 | 6/2017 | Dooley | |
| 2017/0243485 A1* | 8/2017 | Rubin | H04W 72/005 |
| 2018/0052458 A1 | 2/2018 | Tsuji | |

FOREIGN PATENT DOCUMENTS

| | | |
|---|---|---|
| DE | 102014007452 A1 | 11/2015 |
| JP | 2006185136 A | 12/2004 |
| JP | 4684960 B2 | 1/2008 |
| JP | 2008015920 B2 | 1/2008 |
| JP | 2010086269 A | 4/2010 |
| JP | 4499525 B2 | 7/2010 |
| JP | 2011250021 A | 12/2011 |
| KR | 1020160144666 A | 12/2016 |
| WO | WO 2015126318 A1 | 8/2015 |
| WO | WO 2016/081488 A1 | 5/2016 |

OTHER PUBLICATIONS

Core System Requirements Specification (SyRS), RITA—Intelligent Transportation Systems Joint Program Office, Jun. 13, 2011, Revision A, www.its.dot.gov/index.htm.
Search Report dated Jul. 4, 2017 for Great Britain Patent Application No. GB1700254.4 (6 Pages).
Search Report dated Jun. 13, 2018 for Great Britain Patent Application No. GB 1720809.1 (4 Pages).

\* cited by examiner

US 10,529,235 B2

SYSTEM AND METHOD FOR VIRTUAL TRANSFORMATION OF STANDARD OR NON-CONNECTED VEHICLES

PRIORITY CLAIM

This application is a divisional application of U.S. patent application Ser. No. 15/076,210 filed on Mar. 21, 2016 and issuing as U.S. Pat. No. 10,013,881 on Jul. 3, 2018, which is a continuation-in-part of U.S. patent application Ser. No. 14/991,496 filed Jan. 8, 2016 and issued as U.S. Pat. No. 9,959,763 on May 1, 2018.

TECHNICAL FIELD

This disclosure generally relates to systems and methods for avoiding traffic collisions.

BACKGROUND

Newer vehicles are often configured to coordinate their motion through electronic communication technology. Older vehicles often lack such communication technology. A problem is presented in that newer vehicles lack a mechanism for effectively coordinating with older vehicles.

SUMMARY

In various embodiments, the present disclosure includes a system for reducing vehicular collisions having: (a) a vehicle comprising sensors, an acceleration system, a braking system, a processor, and memory; and (b) programs operatively coupled to the vehicle including: (1) a marking program configured to mark an outside vehicle as V2X or standard; (2) a reaction program configured to generate a signal in response to the mark, the signal being based on the mark.

In various embodiments, the present disclosure includes a method of reducing vehicular collisions with a vehicle having sensors, an acceleration system, a braking system, a processor, and memory, comprising: marking an outside vehicle as V2X or standard with a marking program, and generating a signal in response to the mark with a reaction program, the signal being based on the mark; wherein the marking program and the reaction program are operatively coupled to the vehicle.

In various embodiments, the present disclosure includes A system for marking vehicles comprising: a vehicle comprising sensors, an accelerator, brakes, a processor, and memory; a marking program configured to: mark an outside vehicle as V2X or standard, measure position of a marked standard vehicle, assign a confidence to the measured position, compare the confidence to a threshold, transmit, based on the comparison, a supplemental position measurement request to an outside V2X vehicle.

A method of marking vehicles using a vehicle having sensors, an accelerator, brakes, a processor, and memory, comprising: with a marking program running on the processor: marking an outside vehicle as V2X or standard, measuring position of a marked standard vehicle, assigning a confidence to the measured position, comparing the confidence to a threshold, transmitting, based on the comparison, a supplemental position measurement request to an outside V2X vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 1b is a rear perspective view of the vehicle of FIG. 1a.

FIG. 2 is a block diagram illustrating electronic components of the vehicle of FIG. 1a.

FIG. 3 is a block diagram illustrating electronic components of a mobile device operatively connected to the vehicle of FIG. 1a.

DETAILED DESCRIPTION OF EXAMPLE EMBODIMENTS

Figure 1A:
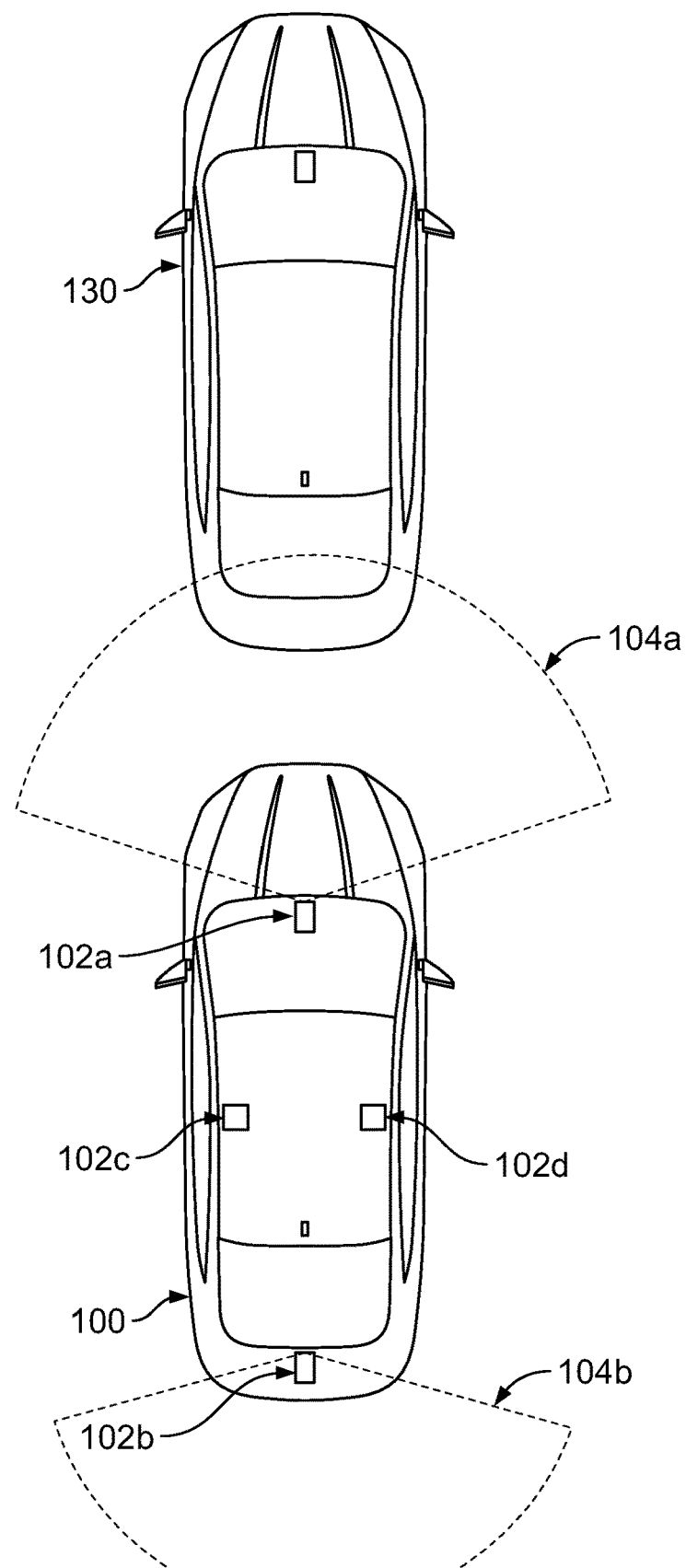
FIG. 1a is a top plan view of a vehicle of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

FIG. 1a shows vehicles 100 and 130 in accordance with one embodiment. The vehicles 100 and 130 may be the same or different. The vehicle 100 may be a standard gasoline powered vehicle, a hybrid vehicle, an electric vehicle, a fuel cell vehicle, or any other type of suitable vehicle. The vehicle 100 includes standard features (not shown) such as a dashboard, adjustable seats, one or more batteries, an engine or motor, a transmission, an HVAC system including a compressor and electronic expansion valve, a windshield, doors, windows, seatbelts, airbags, and tires.

It should be appreciated that the present disclosure generally refers to vehicle features directed to mechanically moving the vehicle such steering, acceleration, and deceleration, as "vehicle drive" or "drive" features or components. The present disclosure may refer to "outside" vehicles. Outside vehicles are vehicles external to a given vehicle, such as vehicle behind or "trailing" the given vehicle or vehicles in front of or "leading" the given vehicle. Vehicles directly in front of or directly behind the given vehicle are generally referred to as "directly leading" or "directly trailing". The present disclosure may use the term "internal" to describe properties or features of a specific vehicle, as opposed to outside vehicles. It should be appreciated that the term "internal sensors" includes all sensors mounted to the vehicle, including sensors that are mounted to an exterior of the vehicle.

It should further be appreciated that each vehicle exhibits vehicle characteristics and driving properties. Characteristics include fixed or constant features of the vehicle, such as its acceleration capacity, braking capacity, V2X capability (explained below), size, weight. Properties refer to variable features of the vehicle, such as its position or location, speed, acceleration, decelerating, level of fuel, and current activity of its lights or horn. Properties may also include some fixed features of the vehicle, such as its size, length, and width. It should be appreciated that the driver of each vehicle has certain propensities. Propensities include reaction time, aggressiveness, passivity, and level of alertness.

Figure 1B:
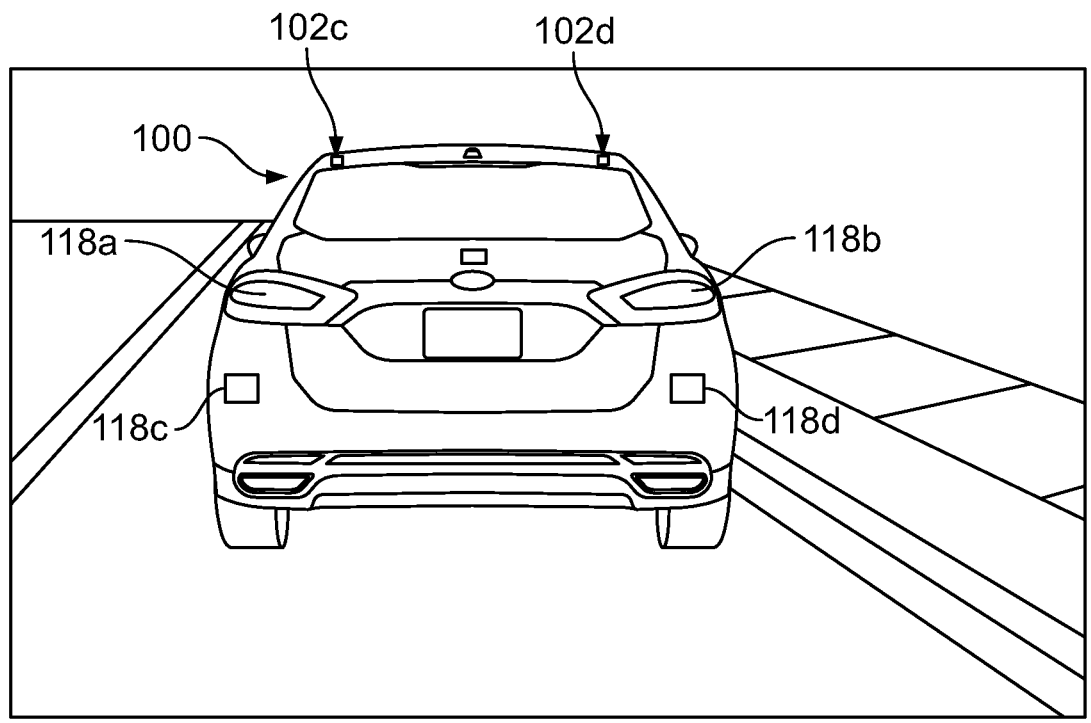

Vehicle 100 may include sensors 102. The sensors 102 can be arranged in and around the car in a suitable fashion. The sensors can all be the same or different. There can be many sensors, as shown in FIG. 1b, or only a single sensor. The sensors may include a camera, ultra-sonic sensors, sonar, LiDAR, radar, an optical sensor, or an infrared device configured to measure properties around the exterior of the vehicle, as indicated by the dashed lines 104a and 104b in FIG. 1a. Some sensors 102 may be mounted inside the passenger compartment of the vehicle 100, on the outside or exterior of the vehicle, or in the engine compartment of the vehicle 100. At least one sensor 102 may be used to identify the vehicle's driver via facial recognition, speech recognition, or communication with a device, such as a vehicle key or mobile phone personal to the driver. The sensors may have an OFF state and various ON states. The vehicle 100, or a device operatively connected to the vehicle, may be configured to control the states or activity of the sensors.

Figure 2:
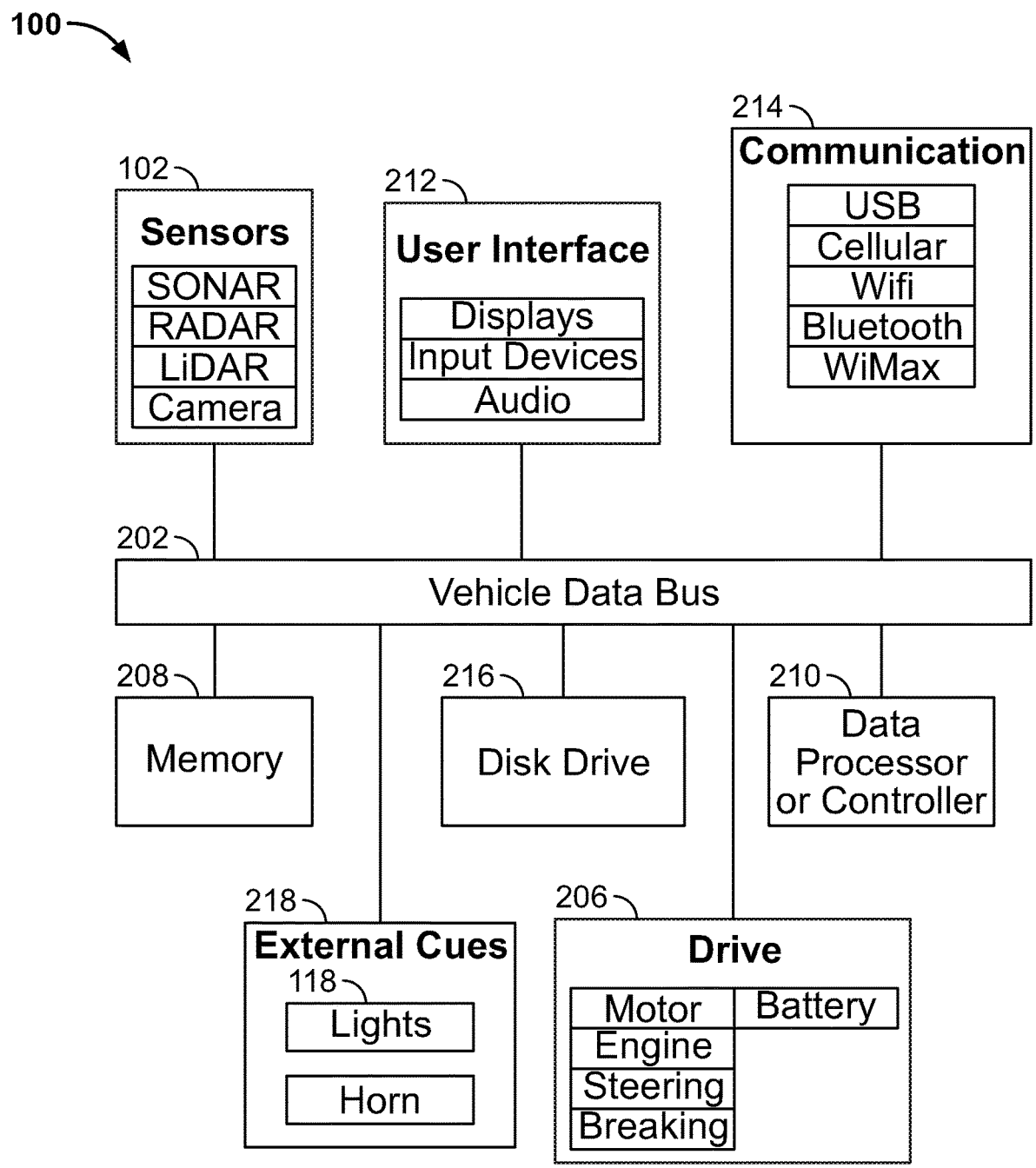

As shown in FIG. 2, in one embodiment, vehicle 100 includes a vehicle data bus 202 operatively coupled to the sensors 102, vehicle drive devices 206, memory or data storage 208, a processor or controller 210, a user interface 212, communication devices 214, and a disk drive 216.

The processor or controller 210 may be any suitable processing device or set of processing devices such as, but not limited to: a microprocessor, a microcontroller-based platform, a suitable integrated circuit, or one or more application-specific integrated circuits (ASICs).

The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); read-only memory; a hard drive; a solid state hard drive; or a physical disk such as a DVD. In an embodiment, the memory includes multiple kinds of memory, particularly volatile memory add non-volatile memory.

The communication devices 214 may include a wired or wireless network interface to enable communication with an external network. The external network may be a collection of one or more networks, including standards-based networks (e.g., 2G, 3G, 4G, Universal Mobile Telecommunications Autonomous valet parking system (UMTS), GSM (R) Association, Long Term Evolution (LTE) (TM), or more); WiMAX; Bluetooth; near field communication (NFC); WiFi (including 802.11 a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols. The communication devices 214 may also include a wired or wireless interface to enable direct communication with an electronic device, such as a USB or Bluetooth interface. A suitable network may also include a direct vehicle to vehicle network.

The user interface 212 may include any suitable input and output devices. The input devices enable a driver or a passenger of the vehicle to input modifications or updates to information referenced by the various programs as described herein. The input devices may include, for instance, a control knob, an instrument panel, a keyboard, a scanner, a digital camera for image capture and/or visual command recognition, a touch screen, an audio input device (e.g., cabin microphone), buttons, a mouse, or a touchpad. The output devices may include instrument cluster outputs (e.g., dials, lighting devices), actuators, a display (e.g., a liquid crystal display ("LCD"), an organic light emitting diode ("OLED"), a flat panel display, a solid state display, a cathode ray tube ("CRT"), or a heads-up display), and speakers.

The disk drive 216 is configured to receive a computer readable medium. In certain embodiments, the disk drive 216 receives the computer-readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the main memory 208, the computer readable medium, and/or within the processor 210 during execution of the instructions.

The term "computer-readable medium" should be understood to include a single medium or multiple media, such as a centralized or distributed database, and/or associated caches and servers that store one or more sets of instructions. The term "computer-readable medium" also includes any tangible medium that is capable of storing, encoding or carrying a set of instructions for execution by a processor or that cause a system to perform any one or more of the methods or operations disclosed herein.

It should be appreciated that the drive of vehicle 100 may be fully autonomous, partially autonomous, or fully manual. In one embodiment, the vehicle 100 is partially autonomous in that it enables a driver to manually steer, brake, and accelerate in normal circumstances but autonomously controls the vehicle drive, specifically the acceleration or the deceleration, in response to an emergency command.

In one embodiment, V2X software or program(s) 905 reside(s) in the memory 208 of the vehicle. 100 The V2X software 905 is configured to send, receive, and evaluate information regarding the driving properties of other or outside vehicles. The V2X program 905 can send and receive data to and from the sensors 102, the user interface 212, the communication devices 214, the drive 206, or any other component operatively connected to the vehicle data bus 202. This capability is reflected in the label "V2X". "V" stands for vehicle, "2" stands for "to", and "X" represents another electronic device such as a vehicle, a mobile device, the Internet, a cloud, or any other suitable electronic device. It should be appreciated that vehicles operatively connected to a suitable V2X program 905 are referred to as "V2X vehicles" or "V2X".

In one embodiment, V2X includes Dedicated Short Range Communications or DSRC, which is known in the technology. DSRC is a wireless communication protocol or system, mainly meant for transportation, operating in a 5.9 GHz spectrum band. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications (GPRS, 3G, LTE, among others), and short range radar, allowing vehicles to communicate their position, speed, heading, relative position to other objects and to exchange information with other vehicles or external computer systems. DSRC systems can be integrated with other systems such as mobile phones. Currently, the DSRC network is identified under the DSRC abbreviation or name. However, other names are sometimes used, usually related to a Connected Vehicle program or the like. More information on the DSRC network and how the network may communicate with vehicle hardware and software is available in the U.S. Department of Transportation's Core June 2011 System Requirements Specification (SyRS) report (available at http://www its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report.

In one embodiment, the vehicle 130 does not include suitable V2X program or software. In other words, the vehicle 130 is a "standard" or "non-V2X" vehicle. In some embodiments, the vehicle 130 includes unsuitable V2X program that is (1) incompatible with the V2X program of vehicle 100, (2) misconfigured, or (3) otherwise not operational with the V2X program 905 of the present disclosure. In this case, the vehicle 130 would also be referred to as "standard" or "non-V2X".

It should be appreciated that other than an absent or misconfigured V2X program, standard vehicles may include any or all of the features and components of a V2X vehicle. In general, standard vehicles, unless otherwise noted, may be fully operational and safe vehicles.

It should thus be appreciated that the present disclosure contemplates at least two types of vehicles: (1) V2X vehicles, such as vehicle 100 and (2) standard or non-V2X vehicles, such as vehicle 130.

Figure 3:
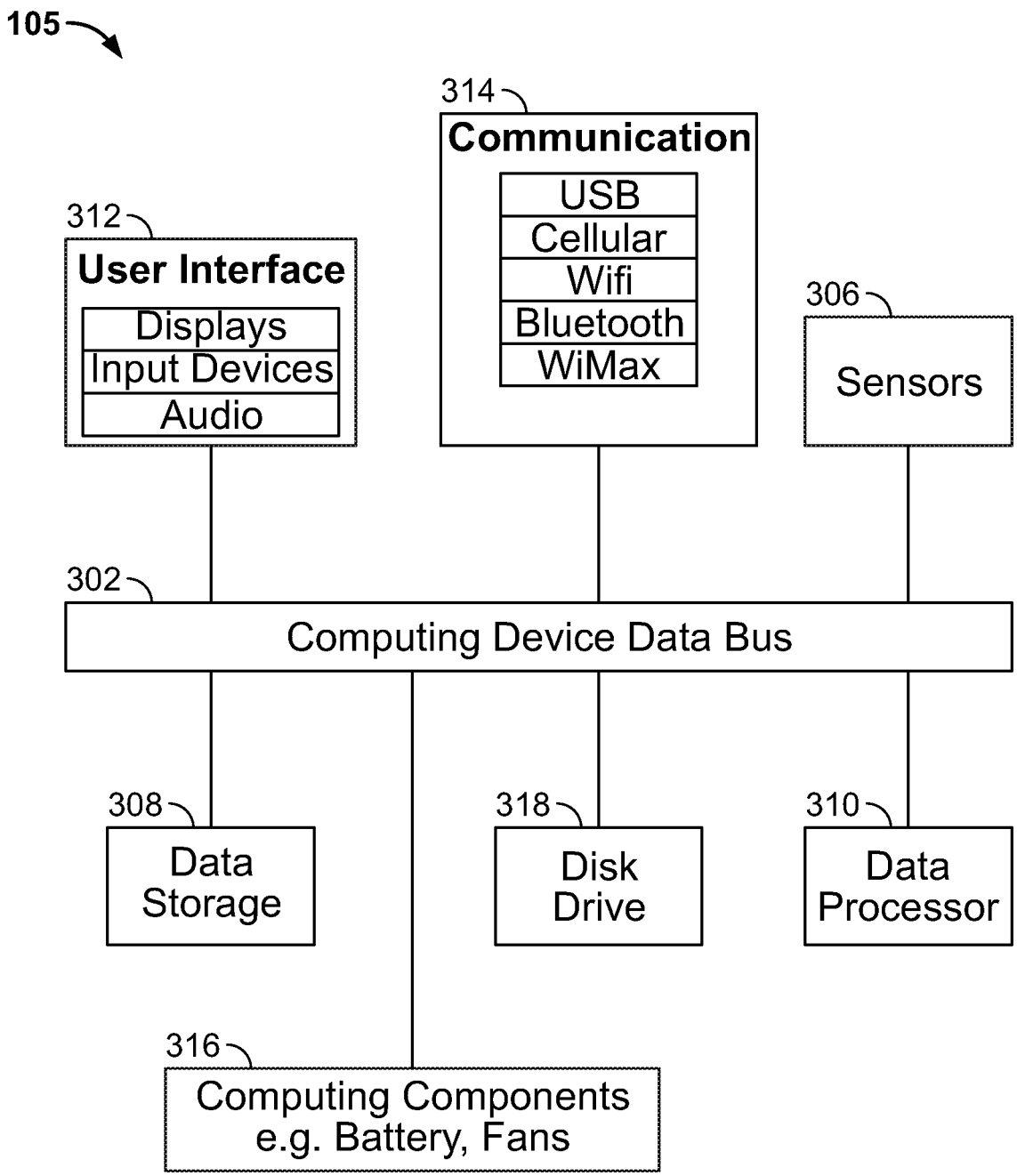

In one embodiment, a computing device 105 is operatively connected to the vehicle 100 via any suitable data connection such as WiFi, Bluetooth, USB, or a cellular data connection. In one embodiment, shown in FIG. 3, the computing device 105 includes a data bus 302, operatively coupled to sensors 306, components 316, memory or data storage 308, a processor or controller 310, a user interface 312, and communication devices 314. It should be appreciated that the electronic features of the computing device 105 may be similar to the features of the vehicle 100 as described above. For example, the communication devices 314 of the computing device 105 may operate similar to the communication devices 214 of the vehicle 100. The same applies to the user interface 312, the sensors 306, the data storage 308, the processor 310, and the disk drive 318. It should be appreciated that the present disclosure may include multiple different computing devices 105. For example, one computing device 105 may be a smart phone, while another computing device 105 is a server connected to the Internet.

Figure 9A:
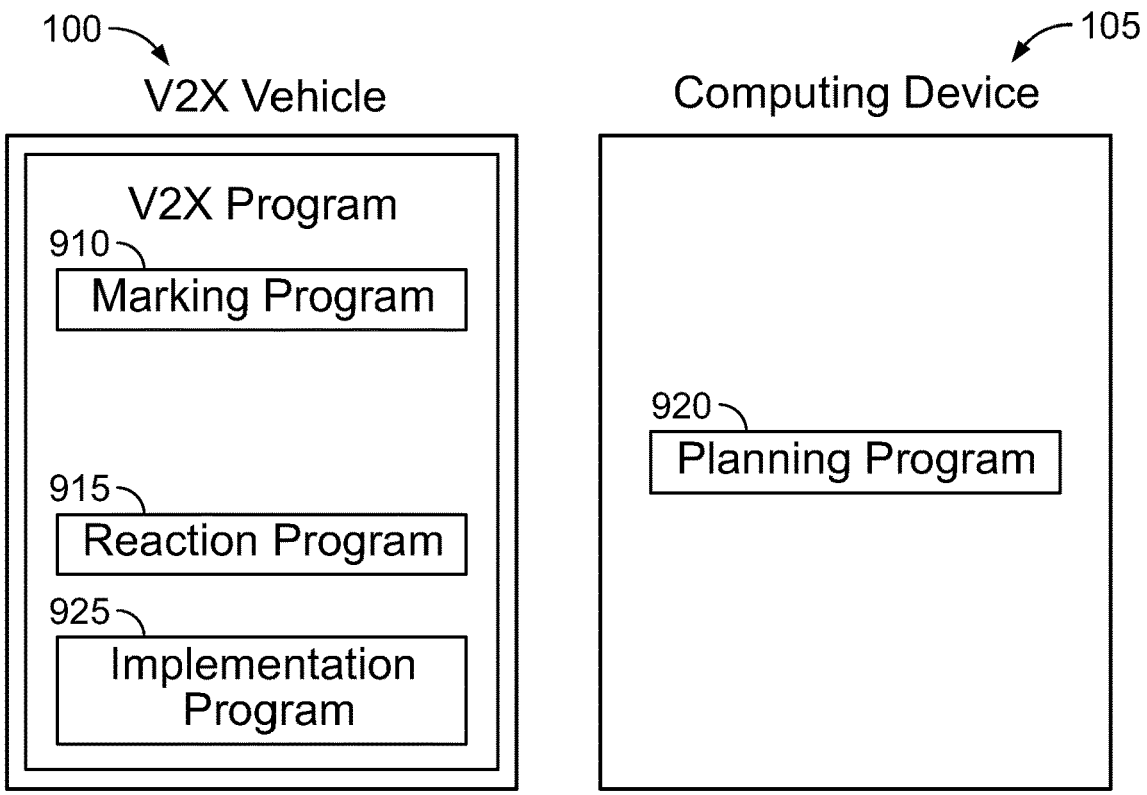
FIGS. 9a and 9b are block diagrams showing two possible arrangements of programs of the present disclosure.
Figure 9B:
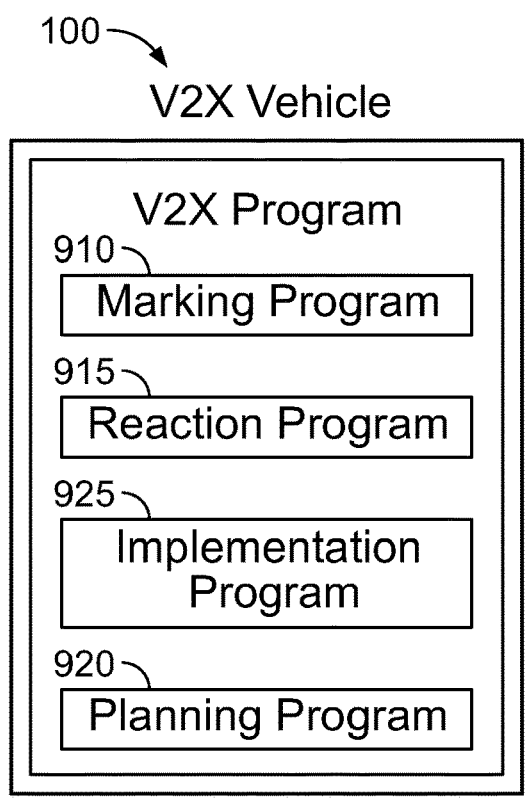
Figure 10:
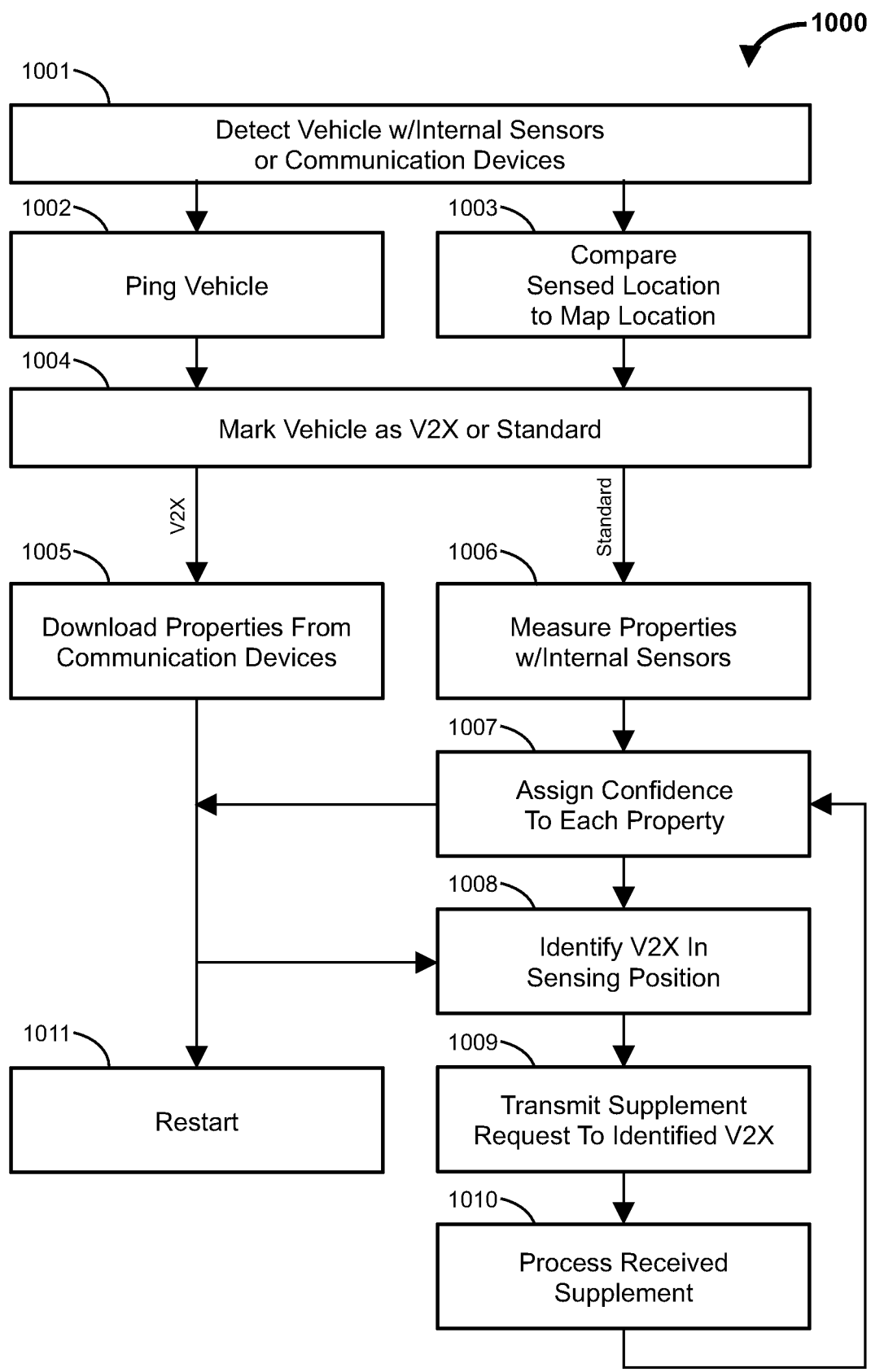
FIG. 10 is a flowchart of another example method of determining whether an outside vehicle is V2X or standard. In some embodiments, the flowchart of FIG. 10 may substitute the flowchart of FIG. 4.

As shown in FIGS. 9a and 9b, in various embodiments the vehicle 100 or the computing device 105 store software programs, and specifically, V2X programs in the memory 208, 308, or in the computer readable medium for execution by processor 210 or 310. Upon execution, the programs enable the vehicle 100 or the mobile phone 105 to transmit and receive information to and from any components operatively connected to the processors 210, 310, including remote devices operatively connected to the processors 210, 310 via communication devices 214, 314. In one embodiment, shown in FIG. 9a, the V2X vehicle includes a marking program 910 for performing method 400, a reaction program 915 for performing method 500, and an implementation program 925 for performing method 700. In the same embodiment, the computing device includes a planning program 920 for implementing method 600. FIG. 9b illustrates that in one embodiment, all of the programs reside in the vehicle memory 208.

It should thus be appreciated that any program may be stored in the vehicle 100, the computing device 105, or an external computer (not shown) operatively connected to the vehicle 100 or the computing device 105. It should be appreciated that any program may be executed on a processor remote from the device. For example, the computing device 105 may store programs that are ultimately executed on the vehicle processor 210.

Figure 4:
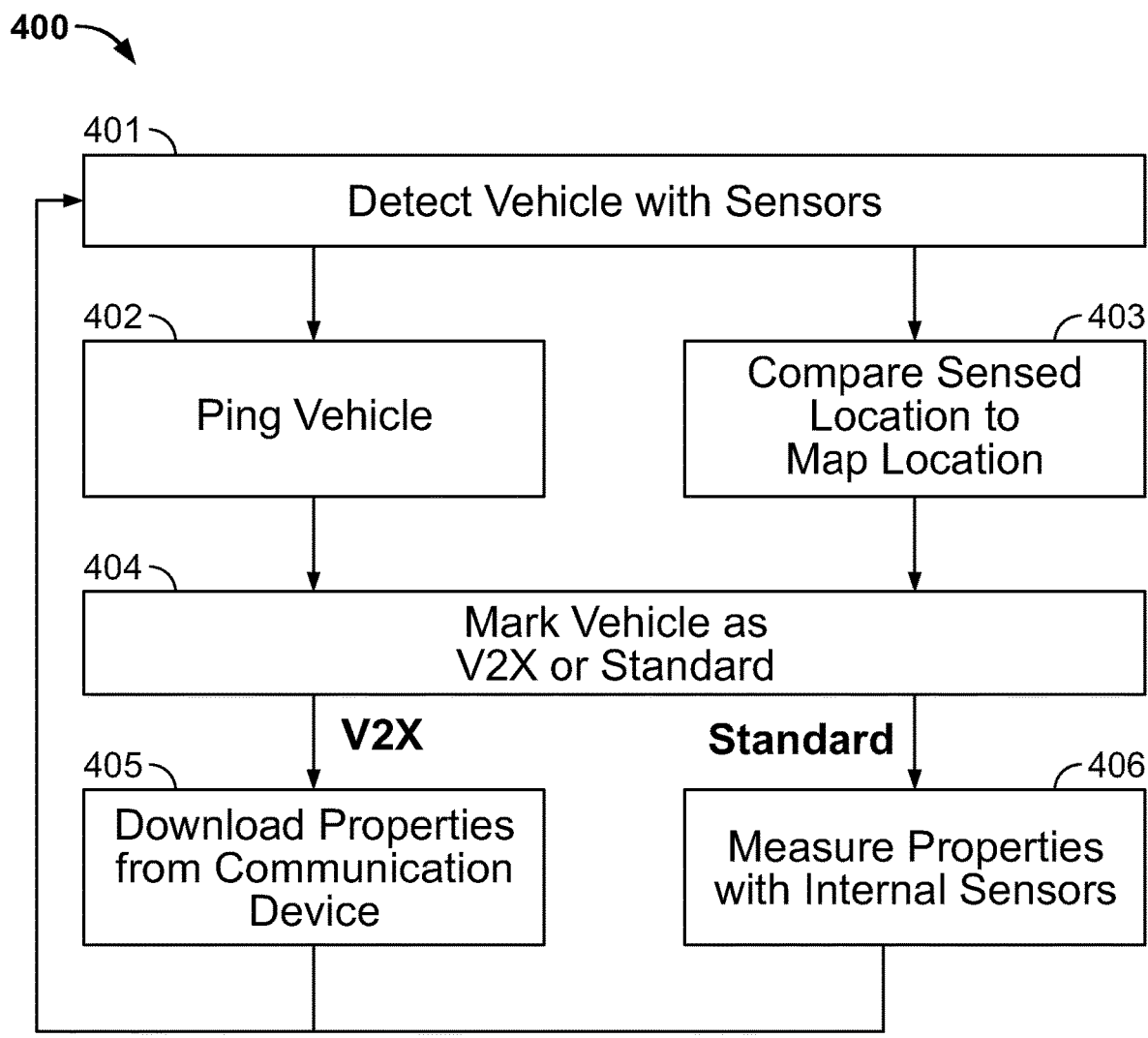
FIG. 4 is a flowchart of an example method of determining whether an outside vehicle is V2X or standard.

Referring now to FIG. 4, an example method 400 of applying the marking program 910 to mark or identify outside vehicles as V2X or standard is shown.

In step 401, the marking program 910 detects an outside object with sensors 102 mounted on the present vehicle. As mentioned above, in various embodiments, the sensors use sonar, radar, lidar, or a camera, or any other object detecting sensor, including an optical sensor, to sense or detect the object. Upon detection, the marking program 910 runs the object through a filtering program or algorithm to determine whether the object is a non-vehicle object or an outside vehicle. Suitable filtering programs are known in the art.

When the object is an outside or external vehicle, the marking program 910 proceeds to at least one of steps 402 and 403. In step 402, the marking program 910 sends a communication or "ping" to the outside vehicle. The ping may be sent directly to the outside vehicle or may be re-directed through an external server such as the Internet or a cloud based computing service. If the outside vehicle is V2X (i.e., V2X enabled), then the outside vehicle affirmatively replies to the ping.

Alternatively, or in addition, in step 403, the marking program 910 compares a detected location of the outside vehicle with a known location of V2X vehicles recorded on a map or database. If the detected location and the recorded location match within predetermined bounds or limits, the marking program 910 marks the outside vehicle as V2X. In some embodiments, the marking program 910 skips step 403 when the outside vehicle affirmatively responded to the ping in step 402 and the outside vehicle is outside the detection area of the local vehicle sensors.

It should be appreciated that in some embodiments, the marking program 910 requires an affirmative or positive response to both steps 402 and 403 before marking the vehicle as V2X in step 404. If the outside vehicle fails one or both of steps 402 and 403, then the marking program 910 marks the vehicle as standard in step 404.

When the outside vehicle is V2X, the marking program 910 stores this information in memory, for use in other programs including the reaction program 915, the planning program 920, and the implementation program 925. More specifically, when the outside vehicle is V2X (i.e., V2X enabled), the programs may download, or at least attempt to download, driving properties and vehicle characteristics of the outside vehicle via a communication device in step 405. In some embodiments, if the download fails, then the marking program 910 marks the outside vehicle as standard.

When the outside vehicle is standard, the marking program 910 stores this status in memory, also for use in the programs. More specifically, when the outside vehicle is standard, the programs measure the driving properties and vehicle characteristics of the outside vehicle with the internal vehicle sensors 102 in step 406.

As shown in FIG. 4, the marking program 910 may be perpetually or continuously executed (i.e., repeated or cycled) at a predetermined frequency. The predetermined frequency may vary in light of the driving properties of the vehicle 100 and driving properties of leading and trailing vehicles.

Figure 5:
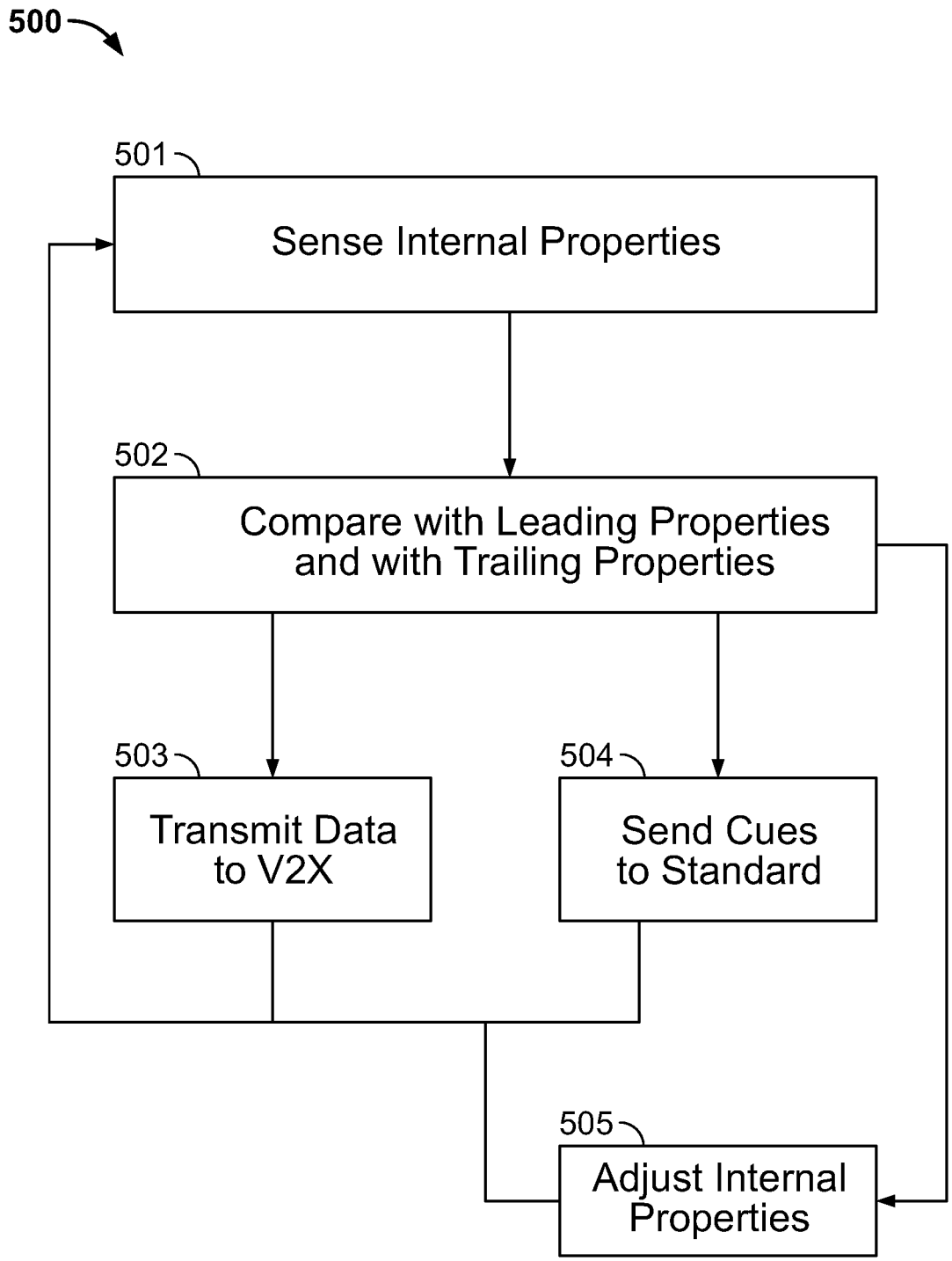
FIG. 5 is a flowchart of an example method of transmitting information to an outside vehicle.

Turning now to FIG. 5, an example method 500 of reacting to outside vehicles with the reaction program 915 or software 915 is generally shown.

In step 501, the reaction program 915 senses the driving properties of the present vehicle 100 via information received from internal sensors 102 of the vehicle 100. Such information may include received GPS signals. In step 502, the reaction program 915 compares the driving properties of the present vehicle 100 with the driving properties of an outside directly leading vehicle and an outside directly trailing vehicle. As discussed above, the marking program 910 may have already stored these statuses in memory and thus the reaction program 915, in some embodiments, simply queries or accesses this information.

In step 502, a range of calculations, predictions, and projections can be executed or performed. In one embodiment, the reaction program 915 determines whether the directly leading vehicle has a safe or suitable buffer space from the present vehicle 100. The buffer space can be defined in terms of distance (e.g., 20 feet between vehicles) or time (e.g. 3 seconds between vehicles given the speed or velocity relationship of the vehicles).

To determine the suitable buffer space, the reaction program 915 may evaluate one or more of the speeds of the vehicles (i.e., one or more of the present vehicle 100, the directly leading vehicle, and the directly trailing vehicle), the positions or locations of the vehicles, the distance between the present vehicle 100 and the directly leading vehicle, the driving properties and vehicle characteristics of the vehicles, the stopping or braking capacity of the vehicles, the acceleration capacities of the vehicles, the fuel or energy level of the vehicles, the specific configuration of the V2X programs installed on the vehicles, and the propensities of the drivers of the vehicles. In various embodiments, the reaction program 915 also factors in corresponding features of the directly trailing vehicle and associated driver. In various embodiments, the reaction program 915 exclusively determines the buffer space in light of the present vehicle 100 and the directly leading vehicle, without considering the directly trailing vehicle.

If the directly leading vehicle is V2X, reaction program 915 sends an electronic communication or instruction to the directly leading vehicle. The communication or instruction may be an acceleration or braking command if the directly leading vehicle is fully or partially autonomous, a display or sound command, or simply an information result of the evaluation for further use by the directly leading vehicle. In some embodiments, the reaction program 915 sends no communication or instruction to the directly leading vehicle in response to a positive or safe evaluation.

It should be appreciated that the reaction program 915 performs similar and corresponding operations with respect to the directly trailing vehicle.

If the directly leading vehicle is standard, upon evaluation of the above factors, the reaction program 915 may instruct the vehicle 100 to send a visual or audio cue toward the directly leading vehicle, and specifically toward the driver of the directly leading vehicle. The visual or audio cue may include one or more of a light, a specific light flashing pattern, a specific color or combination of lights, a shape of lights, a specific grid of lights, a curve of lights, multiple moving curves of lights, a specific intensity of light, a sound such as a sound generated by the horn of the vehicle 100, a pattern of sounds, a certain frequency of sound, and a certain intensity of sound. It should be understood that these kinds of cues apply to the other methods and programs disclosed herein, especially in relation to cues directed to outside standard vehicles. It should be appreciated that the selected cues may depend on the driving properties of the vehicle 100, the driving properties of the directly leading vehicle, and the driving properties of the directly trailing vehicle. In some embodiments, the cues for the directly leading vehicle at least partially depend on the driving properties and vehicle characteristics of the directly trailing vehicle.

Prior to generating these cues, the reaction program 915 may evaluate the cues in light of downloaded legal requirements of the present jurisdiction of the present vehicle. For example, some jurisdictions may forbid a vehicle from cueing with an intense blue light.

It should be appreciated that the reaction program 915 performs similar and corresponding operations with respect to the directly trailing vehicle.

In step 505, the reaction program 915 instructs the vehicle 100 to adjust (or in some cases, hold constant) current driving properties.

The method 500 of the reaction program 915 is cycled or repeated at a continuous and predetermined frequency. In some embodiments, the frequency of the method 500 as applied to the directly leading vehicle depends on one or more of the speed of the directly leading vehicle, the position or location of the directly leading vehicle, the distance between the present vehicle 100 and the directly leading vehicle, the stopping or braking capacity of the directly leading vehicle, the alertness of the driver of the directly leading vehicle, the acceleration capacity of the directly leading vehicle, the fuel or energy level of the directly leading vehicle, whether the vehicle is V2X or standard, the specific properties of the V2X program installed on the directly leading vehicle, the driving properties of the directly leading vehicle, the propensities of the driver of the directly leading vehicle, the vehicle characteristics of the directly leading vehicle, and similar or corresponding features of the directly trailing vehicle and its driver.

Similarly, in some embodiments, the frequency of the method 500 as applied to the directly trailing vehicle depends on the same, similar, or corresponding properties of the directly trailing vehicle and the directly leading vehicle. In some embodiments, the frequency of the method 500 as applied to the directly leading vehicle can be different than the frequency of the method 500 as applied to the directly trailing vehicle.

It should be appreciated that the above method has been disclosed to include, in various embodiments, capturing data from a directly leading vehicle, then sending a signal or cue to the directly trailing vehicle based on data related to the present vehicle and the directly leading vehicle.

Figure 6:
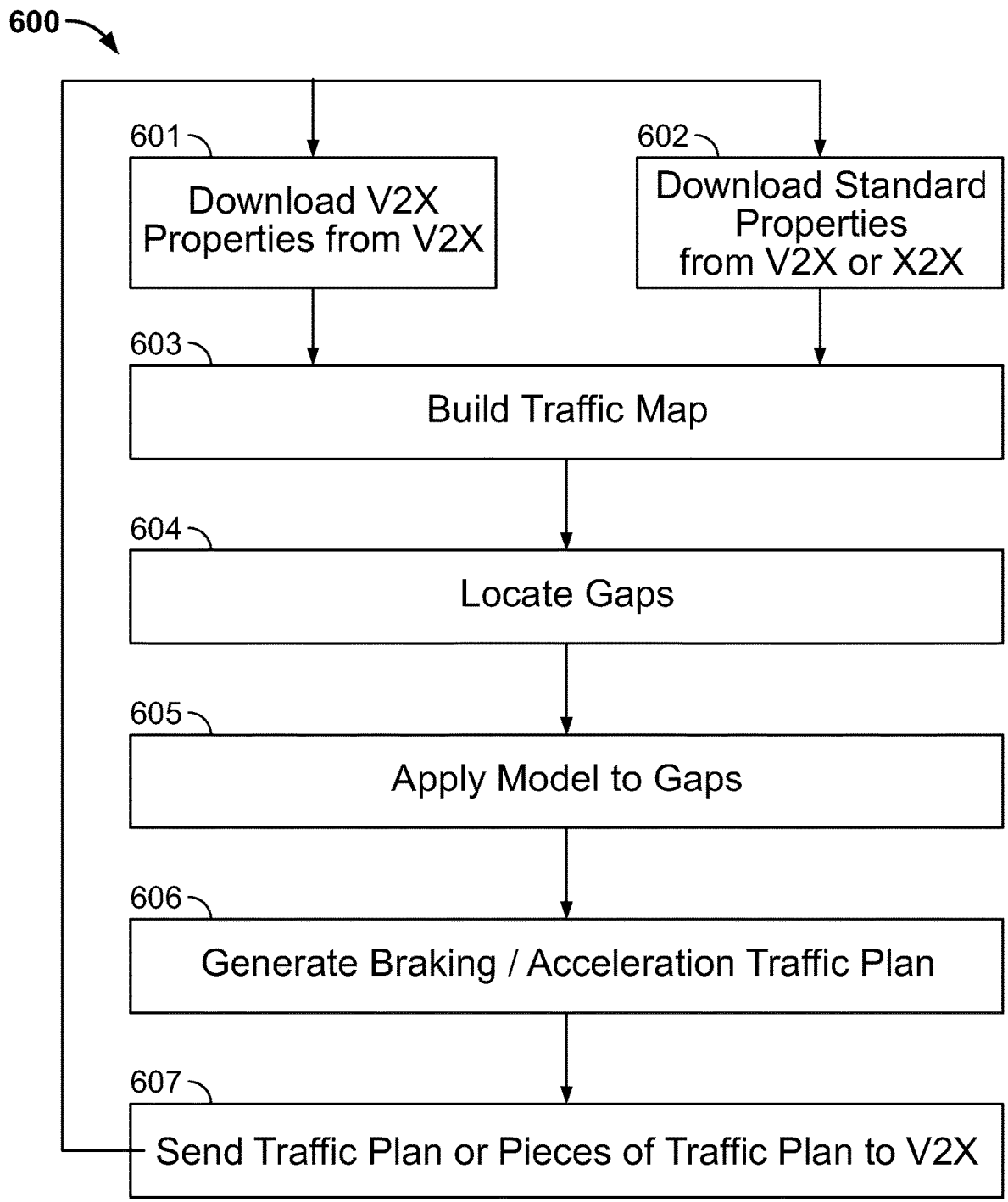
FIG. 6 is a flowchart of an example method of coordinating accelerating and deceleration across a group of vehicles with a traffic map and a traffic plan.

Referring now to FIG. 6, an example method 600 of building a traffic map to generate a traffic plan with a planning program 920 is generally shown and illustrated. In step 601 the planning program 920 downloads driving properties and vehicle characteristics of V2X vehicles within a predetermined area. In one embodiment, the predetermined area is a radius around the vehicle 100. In another embodiment, the predetermined area is a fixed zone or area encompassing a lane of a street, a direction of a street, a street, a town, a city, a county, a state, a country, or a continent. In another embodiment, the predetermined area is dynamically calculated by comparing measured or received values with criteria. The values may include a traffic density, a population density or a number of vehicles within the proposed map. In one embodiment, the predetermined area is a group of vehicles defined between a leading gap or absence of traffic and a trailing gap or absence of traffic, such as the example group of vehicles generally shown in FIG. 8. It should be appreciated that the program may be configured to generate many traffic maps that include overlapping predetermined areas.

The planning program 920 is configured to populate the traffic map with the locations, driving properties, and vehicle characteristics of V2X vehicles within the predetermined area. To accomplish this, the planning program 920 downloads the driving properties and vehicle characteristics of V2X vehicles in step 601. The V2X vehicles may periodically confirm their location with the planning program 920 (or a program operatively coupled or linked to the planning program 920) at a predetermined frequency. The predetermined frequency may be fixed or may depend on the driving properties and vehicle characteristics of the vehicle or outside vehicles.

The planning program 920 is also configured to populate the map with the locations and driving properties of standard or non-V2X vehicles as in step 602. To accomplish this, the planning program 920 may assemble information collected by V2X vehicles about standard vehicles while performing marking program 910 or reaction program 915. Alternatively or in addition, the planning program 920 may assemble information collected from other sources, such as sensor installed in a fixture 850, sensors mounted on an aerial unit such as a drone or helicopter, and sensors installed on mobile devices such as cellular or smart phones. In various embodiments, the planning program 920 instructs V2X vehicles to collect information about a specific area or a specific standard vehicle.

Once the planning program 920 has downloaded information about the vehicles in the area, the planning program 920 may build a traffic map, as in step 603. The traffic map may include the driving properties and the vehicle characteristics of each vehicle, V2X and standard. The traffic map may include further details such as terrain of the roads, conditions of the roads, weather, the identity of specific drivers, known or expected problem areas such as sharp bends in the road or construction areas, and any other details typically associated with a suitable virtual road or street map. In various embodiments, the traffic map includes propensities of the drivers.

In step 604, the planning program 920 may identify gaps or portions of the map with insufficient or inadequate data. These gaps may be the result of standard vehicles being grouped together. In some cases, the gaps may be the result of empty or unoccupied roads. The gaps are further explained below with reference to FIG. 8.

In step 605, the planning program 920 fills in the gaps by applying a suitable model. The model may take various factors into account such as one or more of the population density of the area, the time of day, the day, the month, the weather, and traffic trends in the area given any or all of the time, day, year or weather. In some embodiments, the planning program 920 skips step 605, and simply generates the traffic plan in step 606 in light of the gaps.

Once the planning program 920 has applied the model in step 605, the planning program 920 may generate a traffic plan for some or all of the vehicles in the predetermined area in step 606. The traffic plan may include some or all of any attribute or property related to driving properties, including acceleration, and deceleration or braking. In one embodiment, the traffic plan only includes a braking or deceleration plan. In another embodiment, the traffic plan includes both an acceleration plan and a braking or deceleration plan. The traffic plan may be generated in light of various priorities, such as safety, fuel efficiency, and speed or flow of traffic. In one embodiment, the traffic plan is exclusively concerned with safety, and more specifically, avoiding or at least minimizing, collisions between vehicles. In one embodiment, the traffic plan is exclusively concerned with avoiding, or at least minimizing, collisions between vehicles in the same lane of traffic in the predetermined area. In various embodiments, the traffic plan takes the quality (i.e., the latency, signal strength, and speed) of the V2X vehicles' data connections into account when generating the traffic plan.

In one embodiment, the planning program 920 uses the traffic map to predict or project collisions between vehicles in the same lane of traffic in the predetermined area. The planning program 920 applies the traffic map to predict the probability of a crash or collision between any two vehicles. More specifically, in various embodiments, the planning program 920 projects each vehicle's time to start braking and corresponding necessary braking rate in order to avoid a collision by factoring in the driving properties, the vehicle characteristics, and the driver propensities associated with each vehicle. The planning program 920 compares the projected corresponding necessary braking rate to various precalibrated thresholds to determine the magnitude or probability of a collision. The precalibrated thresholds can vary with one or more of vehicle characteristics, driving properties, driver propensities, and external conditions such as time of day or weather. The planning program 920 may assess urgency based on the magnitude or the probability of a collision.

The planning program 920 generates the traffic plan to eliminate (or at least minimize or optimize) collisions between vehicles. In this embodiment, the planning program 920 generates the traffic plan in light of the driving properties of each vehicle, including its internal speed, location, acceleration or deceleration, the characteristics of each vehicle, the driving propensities or styles of the various drivers, whether an individual vehicles is standard or V2X, and if a vehicle is V2X, whether the vehicle autonomously responds to commands or whether it simply displays information to a driver. The traffic plan may factor in a projected chain of driving events expected to occur in light of the plan.

In one embodiment, the planning program 920 assumes that V2X vehicles will respond to or implement the plan faster than standard vehicles. In one embodiment, the planning program 920 factors in the quality of the data connection between the planning program 920 and the V2X vehicles in projecting the speed with which the vehicles, including V2X vehicles and standard vehicles, will respond to or implement the plan. In some embodiments, the planning program 920 factors in the size and location of gaps in generating the traffic plan. In various embodiments, the planning program 920 orders instructions or communications (i.e., sends communications to a specific vehicle first) sent to the V2X vehicles according to collision urgency and quality of data connection.

Once the traffic plan has been generated, the planning program 920 sends suitable portions of the traffic plan to V2X vehicles involved in the traffic plan in step 607. The degree or amount of information sent to various V2X vehicles may, in some embodiments, be determined by the quality of the data connection between the planning program 920 and a specific V2X vehicle. The degree or amount of information sent to various V2X vehicles may, in some embodiments, depend on the ordering of the communications and the urgency.

In one embodiment, a portion or segment of the traffic plan sent to a particular V2X vehicle includes one or all of (a) instructions on whether and how much the particular vehicle should accelerate, brake, or hold steady; (b) the probability of the particular vehicle experiencing an imminent collision or a rapid deceleration; and (c) instructions on whether and how much the vehicles directly leading and directly trailing the particular vehicle should accelerate, brake, or hold steady.

It should be appreciated that although the method 600 of the planning program 920 is shown as sequential in FIG. 6, this need not be the case. More specifically, steps 601, 602, 603, 605, and 605 may be a single cycling or constantly repeating algorithm and steps 606 and 607 may be different single cycling or constantly repeating algorithm.

Figure 7:
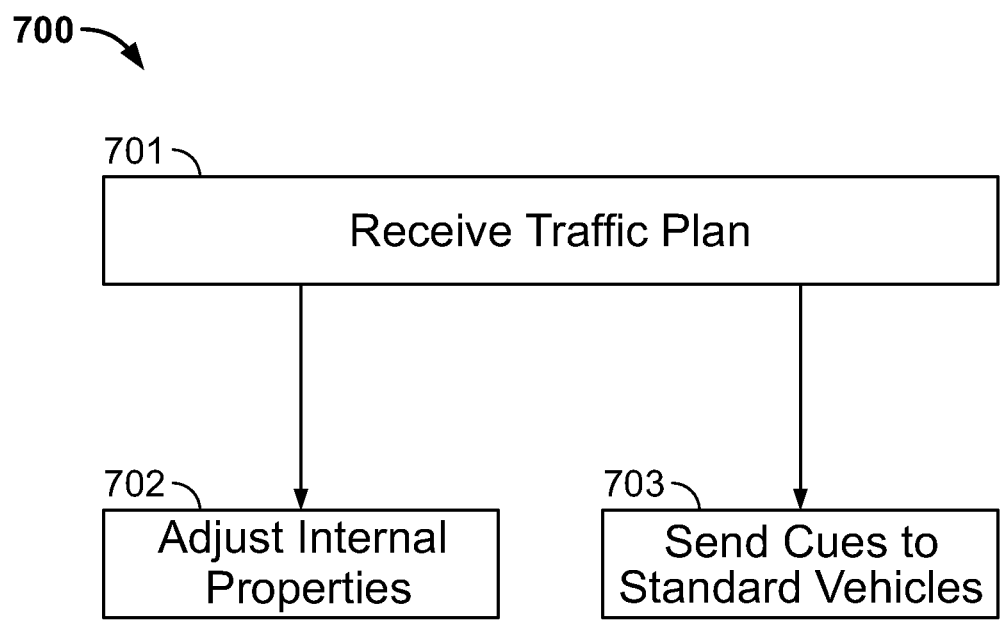
FIG. 7 is a flowchart of an example method of making drive adjustments in response to the traffic plan.

Turning now to FIG. 7, an example method 700 of an implementation program is generally shown and illustrated. In step 701, a particular V2X vehicle, such as vehicle 100, receives the traffic plan or at least a portion or segment of the traffic plan generated in step 607 of FIG. 6.

In step 702 the vehicle 100 takes action in light of the traffic plan. The vehicle 100 evaluates whether the traffic plan requires urgent, autonomous (if applicable) action from the vehicle 100. This could be the case, for example, when a collision is predicted to happen in less time than a normal driver can react to a cue. If the traffic plan requires urgent, autonomous action, and the vehicle 100 is suitably equipped, then the vehicle 100 takes such action. If the vehicle is not suitably equipped or the plan does not require urgent action, then the vehicle 100 may display an internal cue to the driver, such as a visual or audio alert. The alert may direct the driver to accelerate or brake. The kind or magnitude of the alert or cue may depend on the urgency of the required action.

Simultaneously, in step 703, the vehicle may direct a cue to standard vehicles. Cueing is discussed above in relation to method 500.

Figure 8:
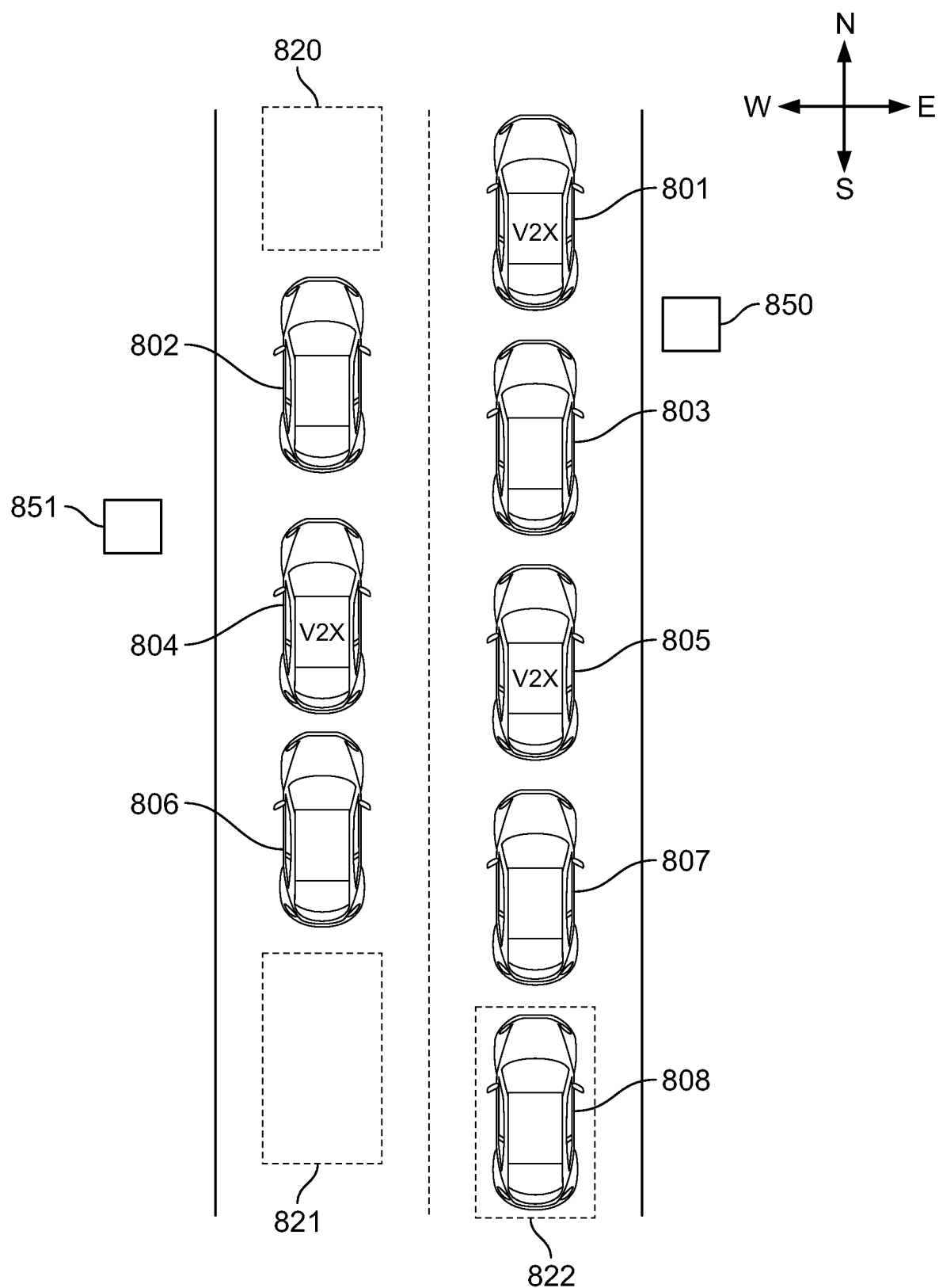
FIG. 8 is a top plan view of an example of vehicles participating in the traffic plan.

Turning now to FIG. 8, one example implementation of the methods 600 and 700 is generally shown and illustrated. Vehicles 801, 804, and 805 are V2X (i.e., V2X enabled). Vehicles 802, 803, 806, 807, and 808 are standard (i.e., non-V2X). Fixture 850 is configured with sensors that measure traffic and driving properties. A server 851 and the fixture 850 may be computing devices 105.

The V2X vehicles 801, 804, and 805 may periodically communicate with the external server 851. More specifically, the V2X vehicles periodically check-in or exchange updates the server 851 in steps 601 and 602. As shown in step 601, the status updates include the driving properties and vehicle characteristics of the V2X vehicles. As shown in step 602, the status updates also include the driving properties and vehicle characteristics of at least some of the standard vehicles. More specifically, V2X vehicle 804 measures and transmits the driving properties and vehicle characteristics of standard vehicles 802 and 806. V2X vehicle 805 measures and transmits the driving statutes of standard vehicles 803 and 807. V2X vehicle 801 measures and transmits the driving properties and vehicle characteristics of standard vehicle 803. The fixture 850 also measures and transmits the driving properties and vehicle characteristics of standard vehicle 803. Note that standard vehicle 808 has not been sensed.

In step 603, the planning program 920 builds the traffic map or database including the driving properties and vehicle characteristics of each identified car, standard and V2X. In step 604, the planning program 920 locates the gaps or voids of information. Here, the planning program 920 may identify gaps 820, 821, and 822.

Gap 820 is the absence of information about a potential vehicle in front of standard vehicle 802. In some embodiments, V2X vehicles may be configured to sense driving properties in 360 degrees, and thus gap 820 would not exist.

Gap 821 is the absence of information about a potential vehicle behind standard vehicle 806. Gap 822 is the absence of information about a potential vehicle behind standard vehicle 807. Note that in this specific example, a standard vehicle 808 occupies gap 822.

In step 605, the planning program 920 applies the model to gaps 820, 821, and 822 to predict or project whether (or the probability of) standard vehicles, such as standard vehicle 808, occupies one of the gaps 820, 821, and 822.

In step 606, the planning program 920 generates the traffic plan for the vehicles 801 to 808 of FIG. 8. The traffic plan may take into account the driving properties of each vehicle, the vehicle characteristics of each vehicle, the propensities of known drivers, the number and location of gaps, the results (if any) of the model, properties of the road, properties of the terrain, weather, time, day, and other factors or properties. The traffic plan may account for expected or projected changes in driving properties (and the timing thereof) given the kinds of instructions and the sequencing of the instructions in the traffic plan.

In step 607, the planning program 920 sends the instructions or pieces of the traffic plan to V2X vehicles 801, 804, and 805. Each piece may include instructions for controlling the driving properties of the specific V2X vehicle, as in step 702, in addition to instructions for signaling or cueing the surrounding standard vehicles, as in step 803. For example, if the planning program 920 projected a collision between vehicles 801 and 803 or a rapid deceleration, the program may instruct vehicle 805 to decelerate in step 702. In addition, the program may instruct vehicle 805 to preemptively signal or cue with sound or lights to vehicle 807 to also decelerate, in order to avoid rear-ending vehicle 805 in step 703.

In various embodiments, the planning program 920 factors in a number of vehicles intermediate two particular vehicles in generating the traffic plan. More specifically, the planning program 920 may assume that as the number of intermediate vehicles increases, the probability of one of the intermediate cars insufficiently braking (or insufficiently braking then overcompensating with rapid braking) increases. In such a case, the planning program 920 may instruct one or more of the vehicles to preemptively brake in anticipation of insufficient braking from a leading vehicle.

It should be appreciated that the above disclosure includes various embodiments where the planning program 920 factors in the speed of a directly leading vehicle and a buffer distance of a directly trailing vehicle. As an example, in these embodiments, the planning program 920 may base deceleration of vehicle 805 on the deceleration of vehicle 803 and the buffer between vehicle 805 and vehicle 807. In these embodiments, if the buffer distance between vehicle 805 and vehicle 807 is small, the planning program 920 may instruct vehicle 805 to apply a lower magnitude of braking than if the buffer distance between vehicle 805 and vehicle 807 was large.

The planning program 920 may instruct vehicle 801 to speed up or accelerate in order to avoid collision with vehicle 803. In addition, the planning program 920 may instruct vehicle 801 and vehicle 805 to preemptively signal or cue to vehicle 803 to slow down or decelerate.

It should be appreciated that the above methods, and specifically, methods 400, 500, 600, and 700 may be configured to mark, assess, evaluate, and cue pedestrians, animals (collectively referred to as pedestrians unless otherwise noted), and fixed objects or obstructions.

For example, method 400 may include identifying an object near a road as a pedestrian, an animal, or a fixed object. The method 400 may measure properties of the object such as the object's position, size, speed, acceleration or deceleration.

Method 500 may include comparing internal driving properties with the properties of the object in light of the kind of object (e.g., human, animal, or inanimate) in step 502, cueing the object (if human or animal) if appropriate, and adjusting internal driving properties of the vehicle 100 in light of the properties of the object.

Similar material applies to methods 600 and 700. More specifically, method 600 may factor in objects when building the map and when generating the plan. Method 700, similar to method 400, may include adjusting internal driving properties of the vehicle 100 in light of the objects in step 702 and may include a step for cueing humans or animals.

It should be appreciated that method 400 may take the form of method 1000. In some embodiments, above disclosure relating to method 400 also applies to method 1000. Method 1000 is similar to method 400 and includes extra steps related to assigning confidences to measurements of standard (i.e., non-V2X) vehicles.

In step 1001, the method 1000, implemented via the marking program 910, detects an outside vehicle using internal vehicle sensors or communication devices. As mentioned above, in various embodiments, the sensors use sonar, radar, lidar, or a camera, or any other object detecting sensor, including an optical sensor, to sense or detect the object. Upon detection, the marking program 910 runs the object through a filtering program or algorithm to determine whether the object is a non-vehicle object or an outside vehicle. Suitable filtering programs are known in the art. Alternatively, the method may detect an outside vehicle via a communication or broadcast from the outside vehicle.

In some embodiments, when the object is an outside or external vehicle, the marking program 910 proceeds to at least one of steps 1002 and 1003. In step 1002, the marking program 910 sends a communication or "ping" to the outside vehicle. The ping may be sent directly to the outside vehicle or may be re-directed through an external server such as the Internet or a cloud based computing service. If the outside vehicle is V2X (i.e., V2X enabled), then the outside vehicle affirmatively replies to the ping.

Alternatively, or in addition, in step 1003, the marking program 910 compares a detected location of the outside vehicle with a known location of V2X vehicles recorded on a map or database. In some embodiments, the outside vehicle passively broadcasts its location to surrounding vehicles. If the detected location and the recorded location match within predetermined bounds or limits, the marking program 910 marks the outside vehicle as V2X. If the marking program 910 detected the outside vehicle via a communication device, then the marking program 910 may skip step 1003.

In step 1004, the marking program 910 marks the outside vehicle as V2X or standard in light of steps 1002 and 1003.

When the outside vehicle is V2X, the marking program 910 stores this information in memory, for use in other programs including the reaction program 915, the planning program 920, and the implementation program 925. More specifically, when the outside vehicle is V2X (i.e., V2X enabled), the programs may download, or at least attempt to download, driving properties and vehicle characteristics of the outside vehicle via a communication device in step 1005. In some embodiments, if the download fails, then the marking program 910 marks the outside vehicle as standard.

When the outside vehicle is standard, the marking program 910 stores this status in memory, also for use in the programs. More specifically, when the outside vehicle is standard, the marking program 910 measures the driving properties and vehicle characteristics of the outside vehicle with the internal vehicle sensors 102 in step 1006.

In step 1007, the marking program 910 assigns confidences to the measurements and the determined properties. The confidences flow from one or more filtering programs that receive and evaluate the results of the internal vehicle sensors. If the internal vehicle sensor is a lidar sensor, for example, the filtering program may assess the measurement for signs of ambient interference through rain, snow, light, or dust. The filtering program may generate a confidence based on a predetermined relationship between confidence and ambient interference. The filtering program may further determine which portion of the sensor (e.g., center or periphery) recorded the measurement and assign a greater confidence to measurements made near the middle of the sensor field than measurements made near the periphery of the sensor field.

If the internal vehicle sensor is a camera, for example, the filtering program may run a classifier that classifies objects recorded in the image. Suitable image classifiers are known in the art and disclosed, for example, in U.S. Pat. No. 8,351,712, which is hereby incorporated by reference in its entirety. A suitable classifier will assign a confidence to each object classification. The filtering program may extract the confidence assigned to any objects classified as a vehicle.

The marking program 910 assigns a confidence to the properties in step 1007. In some cases, a property may be based on a plurality of measurements (e.g., velocity) and therefore the confidence of each measurement contributes to the confidence of the property. After assigning a confidence to the properties, the marking program 910 compares the assigned confidences of the properties to predetermined minimum confidence levels, which can be preset or dynamically calculated according to a formula. In some cases, minimum confidence levels of crucial properties, such as velocity, require a greater confidence level than collateral properties, such as vehicle length or weight. Therefore, the minimum confidence levels of the properties may vary according to the property.

When one or more confidence levels fall below their respective minimum thresholds, the marking program 910 may identify V2X vehicles in position to contribute supplemental, confirming measurements in step 1008. In some embodiments, this means the marking program 910 only sends a contribution request to V2X vehicles with a predetermined or calculated distance range of the standard vehicle. The marking program 910 may identify suitable V2X vehicles by analyzing the properties of the V2X vehicles received in step 1005.

Thereafter, the marking program 910, in step 1009, issues a command to the identified V2X vehicles for supplemental and confirming measurements. The identified V2X vehicles reply with the supplemental measurements and confidences associated with the supplemental measurements. In some cases, the marking program 910 may only transmit the request to a portion of the identified V2X vehicles meeting predetermined criteria. In some embodiments, the number of the portion depends on the kind of property to be measured (e.g., a crucial property such as velocity is assigned to more vehicles than a collateral property such as weight or length). The identified V2X vehicles may perform new measurements to comply with the issued command or may recall and transmit old measurements, if the old measurements meet a predetermined age threshold.

In step 1010, the vehicle receives and processes the supplemental measurements according to predetermined algorithms and returns to step 1007. If the supplemental measurements confirm the original measurements, then the vehicle increases the confidence associated with the properties of the standard vehicle. If the supplemental measurements substantially diverge from the original measurements, then the vehicle lowers the confidence of the properties associated with the standard vehicle. This process may cycle until all properties associated with a standard vehicle meet or exceed the predetermined confidence thresholds, until a time limit elapses, or the standard falls outside of a predetermined range.

It should be appreciated that the method 1000 of the marking program 910 may be simultaneously performed for a plurality of separate and distinct vehicles. It should further be appreciated that the method 1000 may continuously cycle and repeat for each identified vehicle. In some cases, steps 1001 to 1004 cycle at a slower rate than steps 1005 to 1010. More specifically, steps 1001 to 1004 may be a separate and distinct subprogram from steps 1005 to 1010. In some cases, vehicles marked as V2X retain their marking until the vehicle is no longer able to download their driving properties in step 1005, wherein the vehicles are now automatically marked as standard, implicating steps 1006 to 1010.

It should be appreciated that when any of the above methods transmit data to a vehicle, the data may be in the form of an instruction. As discussed above, an instruction may be a command or may be a set of data for the recipient car to evaluate. The command may a command to adjust driving properties (e.g., slow down, speed up, increase or decrease buffer distance, turn on vehicle lights in a specific arrangement) or may be a command to display an option to the driver.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The invention claimed is:

1. A system for marking vehicles comprising:
    a vehicle comprising sensors, an accelerator, brakes, a processor, and memory;
    a marking program configured to:
        mark an outside vehicle as one of either V2X or standard,
        measure position of a marked standard vehicle,
        assign a confidence to the measured position,
        compare the confidence to a threshold,
        transmit, based on the comparison, a supplemental position measurement request
        to an outside V2X vehicle; and
    a reaction program configured to transmit electronic instructions to a V2X vehicle and to only send visual cues to a standard vehicle, the electronic instructions and the visual cues based on a comparison of properties of the vehicle versus properties of the sensed vehicle.

2. The system of claim 1, wherein the marking program is configured to:
    receive the supplemental position measurement from the outside V2X vehicle, and
    update the confidence of the measured position in light of the supplemental position measurement.

3. The system of claim 1, wherein the marking program is configured to measure velocity of a marked standard vehicle based on a plurality of individual measurements and to assign a confidence to the measured velocity based a confidence of each of the plurality of individual measurements.

4. A system for marking vehicles comprising:
    a vehicle comprising a dedicated short range communication (DSRC) transceiver;
    a marking program configured to:
        mark an outside vehicle as one of either V2X or standard,
        measure position of a marked standard vehicle,
        assign a confidence to the measured position,
        compare the confidence to a threshold,
        transmit, via the DSRC transceiver, a supplemental position measurement request to an outside V2X vehicle based on the comparison; and
    a planning program configured to build a traffic database by downloading driving properties of V2X vehicles and standard vehicles from V2X vehicles.

5. The system of claim 4, wherein the planning program is configured to generate a traffic plan that includes vehicle braking rates for avoiding a traffic collision.

6. The system of claim 4, wherein the marking program is configured to:
    receive the supplemental position measurement from the outside V2X vehicle, and update the confidence of the measured position in light of the supplemental position measurement.

7. The system of claim 4, wherein the marking program is configured to measure velocity of a marked standard vehicle based on a plurality of individual measurements and to assign a confidence to the measured velocity based a confidence of each of the plurality of individual measurements.

8. A method of marking vehicles using a vehicle having a dedicated short range communication (DSRC) transceiver, a processor, and memory, comprising:

with a marking program running on the processor:
  marking an outside vehicle as V2X or standard,
  measuring position of a marked standard vehicle,
  assigning a confidence to the measured position,
  comparing the confidence to a threshold,
  transmitting, based on the comparison, a supplemental position measurement request to an outside V2X vehicle; and
  executing a reaction program to transmit electronic instructions to a V2X vehicle and to only send visual cues to a standard vehicle, the electronic instructions and the visual cues based on a comparison of properties of the vehicle versus properties of the sensed vehicle.

9. The method of claim 8, further including, with the marking program:
  receiving the supplemental position measurement from the outside V2X vehicle, and updating the confidence of the measured position in light of the supplemental position measurement.

10. The method of claim 8, further including, with the marking program, transmitting the request only to V2X vehicles within a predetermined distance range of the standard vehicle.

11. The method of claim 10, further including, with the marking program, identifying V2X vehicles in the predetermined distance range with reference to previously downloaded properties of V2X vehicles.

12. The method of claim 10, further including, with the marking program, building a list of V2X vehicles within the predetermined distance range, then select only one vehicle from the list based on predetermined criteria.

13. The method of claim 12, further including, with the marking program, selecting a plurality of V2X vehicles from the list, the selection number depending on the kind of property to be measured of the standard vehicle.

14. The method of claim 8, further including, with the marking program, measuring velocity of a marked standard vehicle based on a plurality of individual measurements and assigning a confidence to the measured velocity based a confidence of each of the plurality of individual measurements.

* * * * *